United States Patent [19]
Spooner

[11] 3,783,210
[45] Jan. 1, 1974

[54] SHAFT POSITION AND WEAR INDICATOR SWITCH DEVICE

[76] Inventor: Robert E. Spooner, 6212 W. Catalpa Ave., Chicago, Ill. 60630

[22] Filed: July 28, 1972

[21] Appl. No.: 276,126

[52] U.S. Cl. ................................. 200/61.4, 200/47
[51] Int. Cl. ............................................. H01h 3/16
[58] Field of Search...... 200/17 R, 18, 61.39–61.44, 200/83 D, 83 Y, 153 T, 47; 73/140, 141 R, 141 A

[56] References Cited
UNITED STATES PATENTS

| | | | |
|---|---|---|---|
| 2,822,436 | 2/1958 | Towle | 200/61.41 |
| 2,820,117 | 1/1958 | Waite | 200/153 T X |
| 3,056,004 | 9/1962 | Davis | 200/83 Y |
| 3,472,077 | 10/1969 | Bucalo | 200/83 D |
| 2,152,947 | 4/1939 | Blomerius | 200/61.41 |
| 3,373,603 | 3/1968 | Chapman | 73/140 |

FOREIGN PATENTS OR APPLICATIONS
353,706  1/1921  Germany .......................... 200/61.4

*Primary Examiner*—J. R. Scott
*Attorney*—Max Dressler et al.

[57] ABSTRACT

A shaft wear indicator for both axial and radial displacement of a shaft is disclosed. One end of an elongated probe assembly is maintained against the center of rotation of an exposed end of the shaft rotatably supported upon bearings in a housing. The probe end facing the shaft is concave, and a ball bearing is captured between this concavity and the shaft end. The probe is resiliently supported at the shaft end in alignment with the shaft axis by being passed centrally through a diaphragm spaced from the end of the shaft and fixed therein, with the diaphragm held about its periphery by a rigid annular plate secured to the housing. The probe is biased toward the shaft by either a spring or by means of the vacuum created over the side of the diaphragm facing the shaft end. A sensing device including one or more microswitches bears upon the end of the probe opposite that facing the shaft to sense displacements of the shaft with respect to the shaft housing transmitted via the probe assembly. More than one diaphragm, each of a different exposed area and axially spaced from the other along the probe assembly to define chambers therebetween, may be used for convenience if detection of bearing oil pressure failure is also desired. If a positive pressure greater than atmospheric is provided, rather than a vacuum with double-acting micro-switches, pressure failure detection may also be accomplished with a single diaphragm.

19 Claims, 4 Drawing Figures

PATENTED JAN 1 1974 3,783,210
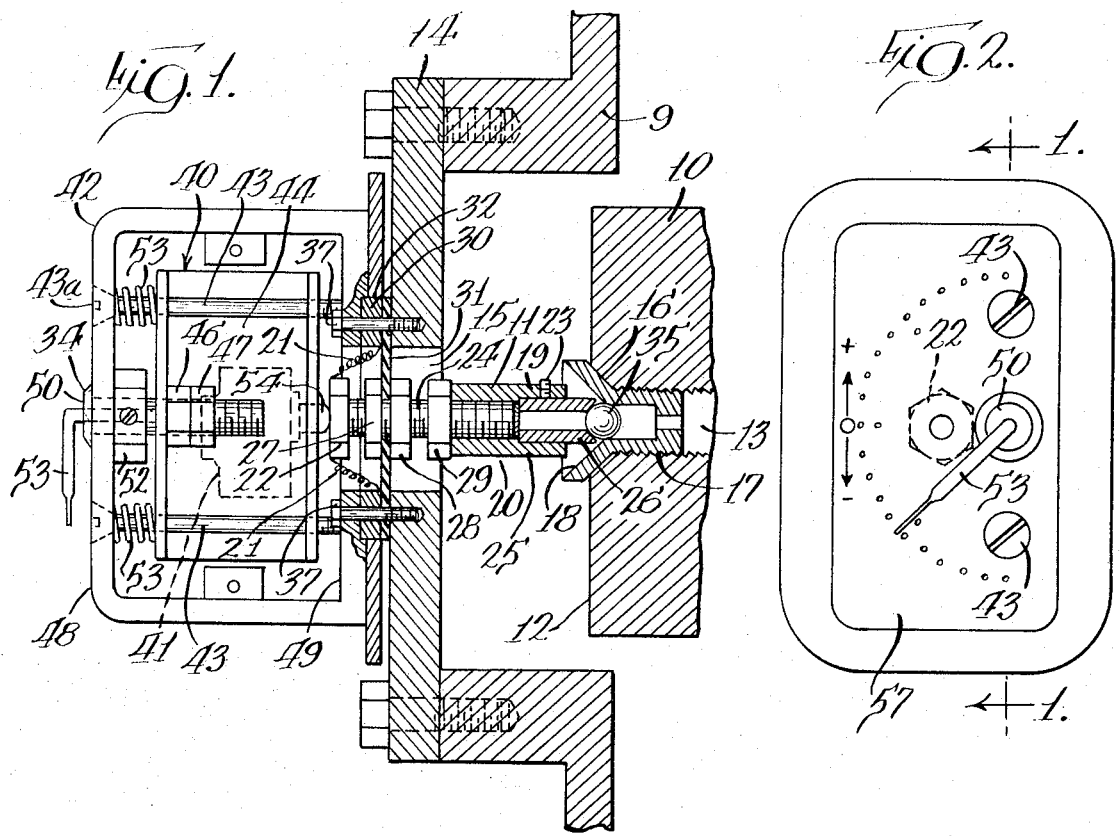
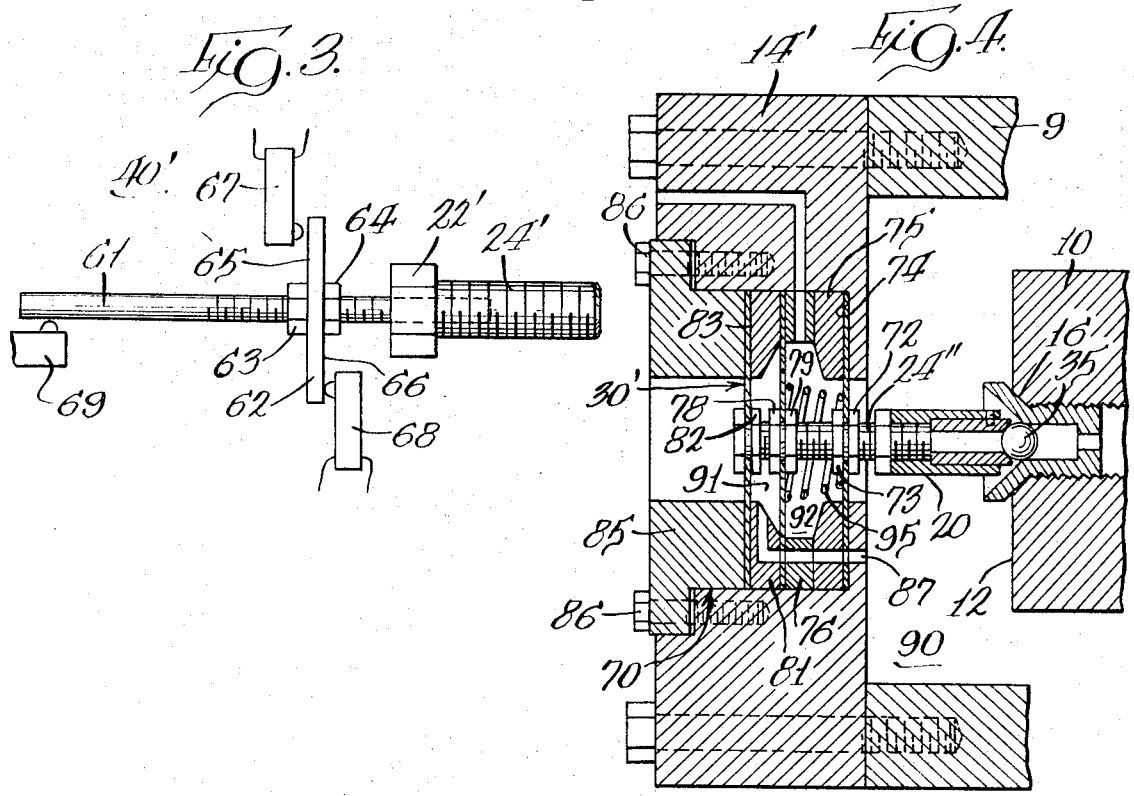

SHAFT POSITION AND WEAR INDICATOR SWITCH DEVICE

BACKGROUND OF THE INVENTION

This invention pertains to apparatus for use with a shaft to indicate any variation in its position. More particularly, the invention relates to apparatus for indicating non-rotational displacements of a shaft from a normal position regardless of whether the shaft is rotating, to measure bearing wear, abnormal expansion, for example, due to heat, or to indicate bearing failure.

It has been found highly useful in connection with all types of machinery employing power-transmissive shafts to have a reliable, relatively uncomplicated means for indicating wear or expansion in the shaft bearings. This is particularly true of machinery employing power-transmitting shafts under particularly high loading or under high intermittent stress, such as, for example, heavy-duty refrigeration equipment for commercial or industrial use. In many such cases, unanticipated breakdown of equipment interrupts numerous dependent activities and leads to great expense and inconvenience. Thus it becomes highly desirable that such machinery be provided with a capability for detecting axial shaft movements which would indicate when tolerances are being exceeded, and thus when the equipment bearings are in need of attention, before breakdown occurs. Equally desirable is the capability of monitoring on a continuous basis the shaft position so that at any time the rate of wear may be known.

In the prior art, the indication of when a predetermined level of wear or deviation from tolerance was reached has been attempted by various complex indirect expedients thought to be necessary because of the rotation of the shaft. These expedients have not afforded a continuous monitoring of the rate of wear, nor have they been very accurate or reliable in indicating displacements of the shaft which exceed tolerances.

SUMMARY OF THE INVENTION

The apparatus of the present invention is for use with a shaft or the like supported on at least one bearing in a supporting housing and indicates non-rotational displacements of the shaft, which may be either axial or radial in nature, or both. The apparatus includes a displacement transmitting member, such as a probe, contacting at least a portion of one end of the shaft which contacts the axial center or rotation of the shaft end, and a means secured to the supporting housing for resiliently supporting the displacement transmitting member to maintain the transmitting member against the shaft in end contact position while at the same time allowing the member to move with the shaft. In the case of the probe contacting the axial center of the shaft end, the resilient support of the probe includes means secured to the housing for movably supporting the probe in a position immediately adjacent the shaft end and substantially in line with the axis of the shaft. In this manner, both axial and radial displacements of the shaft, which may or may not be rotating at high speed, are transmitted to a non-rotating member, where they may be detected by a sensing device. Thus, the apparatus may also include means including switch means supported upon the housing and bearing upon the member which transmits the displacements of the shaft for sensing such displacements and providing a single representative thereof. In this manner movements of the shaft which would indicate imminent bearing failure are indicated. Also, axial travel of the shaft with respect to the housing may be directly measured from the displacement transmitting member, which is in continuous contact with one end of the shaft.

BRIEF DESCRIPTION OF THE SEVERAL VIEWS OF THE DRAWINGS

FIG. 1 is a cross-sectional view of a shaft displacement indicator apparatus embodying the invention and taken along the line 1—1 of FIG. 2, together with fragmentary views of the shaft and its housing;

FIG. 2 is a front elevational view of the apparatus of FIG. 1 showing a dial and pointer arrangement displaying shaft displacement distances;

FIG. 3 is a diagrammatic illustration of a sensing device for use in the apparatus of FIG. 1 or FIG. 4 rendering signals representative of axial and radial shaft movements; and FIG. 4 is a cross-sectional view of another embodiment of a shaft displacement indicator according to the invention but which also indicates pressure failure.

DETAILED DESCRIPTION

While this invention is susceptible of embodiment in many different forms, there is shown in the drawings and will herein be described in detail a preferred embodiment of the invention and a modification thereof, with the understanding that the present disclosure is to be considered as an exemplification of the principles of the invention and is not intended to limit the scope of the invention to the embodiment illustrated. The scope of the invention will be pointed out in the appended claims.

A power transmitting rotatable shaft 10 or the like, coupled to any of various types of machinery, or which is an integral part thereof, having an exposed end face 12 is supported in a shaft housing upon one or more suitable bearings to withstand thrust and radial loads. In this case the shaft is mounted so that as wear occurs, it moves slowly to the right, although the invention works equally well in the opposite sense. Shaft end 12 is covered by a cover plate assembly 14 having a central circular aperture 15 and secured to the housing 9 in a position spaced from and parallel with shaft end face 12, and so that the central aperture 15 is aligned with the axis of the shaft 10. The cover plate assembly 14 may serve with shaft housing 9 as an enclosure or chamber for confining a fluid under pressure, for example, oil for lubrication purposes, or for confining a vacuum, or air under pressure depending on the needs of the shaft or machinery associated therewith.

The indicating apparatus of the invention includes an elongated probe assembly 20, with one end 21 positioned in continuous contact with the center of rotation of shaft end 12 on the axis of the shaft 10. The support means 30 resiliently but non-rotatably supports the probe assembly 20 in such shaft end contact position through cover plate aperture 15 in alignment with the shaft axis in a resilient manner so that end 21 in contact with shaft end 12 is movable axially as well as radially under the influence of shaft displacements. A sensing device 40 incorporating at least one microswitch 41 supported on a plate assembly 14, indicates movement of the end 22 of probe assembly 20 opposite end 21 with respect to the shaft housing 9 by providing a warning or control signal.

The shaft 10 is provided with a cylindrical bore 13 at the center of rotation of end 12 having an axis coinciding with that of shaft 10. Bore 13 is internally threaded to accept a stud 16 having a tubular cylindrical portion 12, with external diameter and threading matching that of bore 13, and a smaller internal diameter, with the stud 16 being threaded into bore 13. Stud 16 also incorporates at one end of its cylindrical portion 17 a portion 18 having the form of a tubular conical section extending from one end of the cylindrical portion 17 and terminating in an expanded end having an inside and outside diameter which is enlarged compared to that of cylindrical portion 17.

Probe assembly 20 includes an elongated threaded bolt 24 having a head which constitutes end 22 of the probe assembly 20 and the telescoping tubular sleeve 25 and 26, the latter preferably of a bronze bearing material, carried at the end of bolt 24 opposite end 22. Bolt 24 also carries between the sleeves and head 22 the lock nuts 27, 28' and 29. Sleeve 25 is divided generally equally between a portion 11 having an inside diameter and threading matching the diameter and threading of bolt 24, and a portion 19 having a differing inside diameter than the inside diameter of portion 19, equal to the outside diameter of sleeve 26, so that sleeve 26 may be slidably moved within portion 19, with portion 11 being threaded on bolt 24, and locked thereon with the aid of lock nut 29. The end of sleeve 26 facing stud 16 and opposite sleeve 25 is countersunk to provide a concave depression facing stud 16 axially aligned therewith.

In any case, support means 30 supports probe assembly 20 upon cover plate 14 at a point on bolt 24 between end 22 and sleeve 25. In includes a thin flexible diaphragm 31 of a diameter larger than aperture 15 through which probe bolt 24 is passed centrally and to which it is secured on bolt 24 between end 22 and sleeve 25 by means of lock nuts 27 and 28 on either side of the diaphragm. Diaphragm 31 is positioned on bolt 24 against the side of cover plate 14 opposite shaft end face 12 and with a peripheral annular region overlapping that side of cover plate 14.

A rigid annular pressure plate 32 matching the annular overlap region of diaphragm 31 and with a central aperture of diameter equal to aperture 15 is positioned in registration over the annular overlap region of diaphragm 31 and held against diaphragm 31 and cover plate 14 by means to be described below, thereby supporting diaphragm 31 about its periphery and achieving the resilient support of bolt 24, which is suspended from the center of diaphragm 31, together with its associated probe assembly elements, in the axially aligned position.

A ball bearing 35 preferably of high hardness and wear resistance, and of diameter slightly larger than the internal diameter of cylinder portion 17 and stud 16, is captured between the concave end of sleeve 26 and the stud 16 with sleeve 26 being received into conical stud portion 18. Ball 35 is thereby held at the junction between stud portions 18 and 17.

In a typical installation, the diaphragm 31 forms an air-tight seal about probe assembly 20 and over aperture 15 in cover plate 14, and a vacuum is maintained in the shaft housing at least in the region between the shaft end 12 and cover plate 14. This causes the diaphragm to flex inwardly toward the shaft end 12 under atmospheric pressure and thereby bias the probe assembly 20 which it supports toward shaft end 12 to achieve a positive contact between the concave end of sleeve 25, ball 35, and stud 16. Alternatively, springs 21 are used between cover plate 14 and probe end 22 to bias probe assembly 20 toward shaft end 12, or such springs may be used to augment or even diminish the force due to the vacuum. Sleeve 26 is adjustable in its axial extension by telescoping into and out of portion 19 of sleeve 25 and locked in the desired length by turning the stud screw 23, thus aiding in achieving a positive contact between the concave end of sleeve 26, ball 35, and stud 16.

Sensing device 40 is positioned adjacent end 22 of probe assembly 20 on the side of cover plate 14 opposite shaft 10. It is contained within a casing 42 of generally rectangular closed form open at one end having opposed flat ends 48 and 49. The casing 42 is positioned with its end 49 against cover plate 14 with its central axis aligned with that of shaft 10. Casing end 49 is provided with a central circular aperture of diameter equal to that of aperture 15, and the casing 42 is secured to cover plate 14 with pressure plate 32 and diaphragm 31 held in between, and with all central apertures, those of casing end 49, pressure plate 31 and cover plate 14, in alignment with aperture 15, by at least two fastening bolts 37 threaded through small circular access holes provided in elements 49, 32 and 31 near the central apertures into similar but threaded apertures in plate 14. Within casing 42, a pair of elongated guide bolts 43 are provided extending from side 48 to side 49 across the casing parallel to, and to one side of, the casing central axis. A switch carrier 43 having a generally rectangular flat portion 44 is slidably secured with portion 49 parallel to the axial direction to the bolts 43a so that they pass to one side of portion 44. Carrier 43 is thereby movable along the axial direction toward and away from probe end 22. The offset of the guide bolt 43a from the central axis insures that one surface of portion 44 will be adjacent and just to one side of probe end 22.

On the other surface of flat portion 44, a lock nut 46 is secured between guide bolts 43 and adjacent the transverse edge of carrier 43 opposite probe end 22, so that its axis is parallel to that of the shaft but offset therefrom. A bolt 50 incorporating a depth micrometer arrangement as is known in the art is passed through an aperture in casing end 48 and through lock nut 46, with an adjustment nut 52 securing the bolt 50 to the casing side 48, and a second lock bolt 47 limiting travel of the carriage inwardly, in the direction toward shaft 10. A pair of carrier tension springs 53 held on the guide bolt 43 between casing portion 48 end and carrier 43 bias the carrier toward the shaft up to a limit imposed by lock nut 47. Thus the carrier can be resiliently biased and held within a narrow tolerance at any of a range of positions relative to the probe end 22.

Microswitch 41 is mounted to the side of carrier flat portion 44 adjacent probe end 22. The switch incorporates a probe portion 54 and is positioned on portion 44 to take advantage of the transverse offset of that portion so that switch probe 54 bears on end 22 of probe assembly 20. Adjustment of the travel of the carrier 44 using lock nuts 46 and 47 is carried out to properly tension the switch probe 22 in accordance with the degree of tolerance in axial displacement which it is desired to permit before triggering switch 41. Accordingly, when the shaft has moved inwardly toward the right because of shaft or bearing wear or both, a distance greater than tolerance predetermined by the tension setting, by nuts 46 and 47, of the switch 41, the switch opens or closes a simple control or warning circuit, for example, an indicator lamp or a safety shut-off relay, to indicate that the shaft movement with respect to housing 9 has exceeded the desired tolerance.

At the same time, a continuous readout of axial travel with respect to housing 9 is provided by the micrometer arrangement included in bolt 50, which monitors the position of carrier 43. As is seen in FIG. 2, pointer 53, secured to the micrometer arrangement in bolt 50, moves over a semicircular scale on casing side 48 through a 100 degree travel. In a typical illustrative example, the scale division markings are at 9 degree intervals and represent 0.001 inch movement of the carrier 43 in the axial thrust direction in rsponse to probe movement in accordance with shaft travel as the shaft bearings wear.

The FIG. 1 apparatus as described indicates displacements of the shaft in the axial direction due to the construction of the mounting of its sensing device 40, despite the transmission by the probe assembly 20 of both radial and axial movements of the shaft 10. Under the action of the vacuum in the region between cover plate 14 and shaft end 12 or of spring 21, the diaphragm 31 flexes toward shaft 10 to bias the probe assembly 20 continually toward the shaft. Because of its concave end in contact with ball 35, sleeve 26 will be urged up and down in the radial direction as well as axially, in accordance with any similar movements of the shaft 10. The flexibility of the diaphragm permits it to bend so that, for example, when sleeve 26 is urged upwardly by a radial displacement of shaft 10, probe assembly end 22 moves downwardly. Such radial movement will not be sensed by switch probe 54 bearing axially on end 22.

In applications where it is important to additionally monitor radial movements, a sensing device which includes at least one additional switch oriented with its probe transverse to the axial direction and bearing on one side of end 22 is provided. Such an arrangement may be effected in a number of ways, one of which is to add a transversely acting switch to the sensing system 40 of FIG. 1. Another 40' is illustrated in FIG. 3 which may be used in place of sensing device 40 in FIG. 1 to accomplish both radial and axial sensing. Device 40' presupposes the use of a probe bolt 24' which is the same as bolt 24 except that it is provided with a threaded axial bore at its head end 22' into which threaded rod 61 is secured to project axially therefrom. Rod 61 passes through a switch contact plate 62 having opposed flat surfaces 65 and 66 and which is secured in a position spaced from end 22 and transverse to rod 61 by the lock nut 63 and 64. A pair of microswitches 67 and 68, positioned to bear on respective plate surfaces 65 and 66, and microswitch 69, positioned to bear on the longitudinal surface of rod 61, are adjustably held in position by means (not shown) supported on cover plate 14. The tension of each of the switches against its respective surface is adjusted for a predetermined tolerance so that they yield a warning signal when the shaft displacement corresponding to that tolerance, as transmitted by probe bolt 24', is exceeded.

The device 40' is double-acting in the axial direction and it may be made double-acting in the radial direction as well. That is, an axial displacement of the shaft axially inward, away from plate 14, beyond the predetermined tolerance will be detected by switch 68, and a displacement outward in the opposite axial direction beyond the predetermined tolerance will be detected by switch 67. Similarly, switch 69 may be a double-acting one, to detect both a radial movement which pressures the switch probe beyond a preset tolerance, as well as one which drops such pressure below the present tolerance. In the same manner, one or more further switches of either single or double-acting type may be positioned about a circumference of rod 61 for more precise radial sensing. Such double-acting switches or switch arrangements may be used in the FIG. 1 sensing device 40 as well, to enable detection of displacement in both axial directions, and, if at least a second transversely acting switch 69 is used, in opposite radial directions as well.

Such a double-acting capability of the sensing device is highly useful when it is desired not only to monitor inward shaft displacements, but also to monitor vacuum or spring failure, or expansion due to heat. In case of such failure or expansion, the diaphragm 31 will restore itself from a flexed to a flat attitude, with a consequent movement of the probe assembly 20 outwardly away from the shaft, so that a switch sensitive to both directions of axial displacements is needed. In many types of machinery, the region between shaft end 12 and cover plate 14 which as was stated previously may be a part of a sealed enclosure or chamber, contains instead of the vacuum, air under pressure, or oil under pressure, due to for example the typical forced lubrication systems for bearings which are likely to be used with heavy duty machinery. In such cases, the FIG. 1 apparatus may also be used to provide warnings of pressure failure and bearing expansion, as well as shaft bearing wear, with the use of a spring 21 biasing the probe assembly 20 toward the shaft end 12, and with microswitch 41 chosen to be a double-acting one.

However, the FIG. 4 embodiment is especially useful under such pressurized conditions for the detection of either bearing or pressure failure, particularly when the pressure failure to be sensed is at a remote location other than at the shaft end 12. The FIG. 4 apparatus is similar to that of FIG. 1 in most respects, having a like probe assembly 20', stud 16 secured centrally within end 12 of shaft 10, and shaft housing 9. Cover plate 14' is basically like cover plate 14 of FIG. 1 and has a like central aperture 15' except for being of a greater thickness about its periphery compared to its center so as to define a deep cylindrical central recess 70 on the side of the plate 14' opposite the shaft 10 of a predetermined diameter greater than that of aperture 15' and communicating therewith. However, probe assembly support means 30', while in principle similar to support means 30, differs in that it is comprised of a series of flexible diaphragms and pressure plates, all of which are of the predetermined diameter and through which the probe bolt 24'' is centrally passed as in FIG. 1, and all of which are spaced axially along probe assembly 20 adjacent probe end 22 and positioned completely within recess 70 in registration with each other.

Thus inner diaphragm 71 is secured on bolt 24'', which may be either of the bolt 24 type or of the bolt 24' type, near the end opposite head 22' by means of lock nuts 72 and 73, against the surface 74 of cover plate 14' opposite that facing shaft 10. A pressure plate 75 provided with a central aperture, which at one face matches aperture 15' in diameter, and at the other face is substantially enlarged to an intermediate diameter greater than that of aperture 15', but less than the predetermined outside diameter, is positioned over diaphragm 71 with its smaller aperture side toward 15' and in registration therewith. A spacer plate 71 having an aperture of the same diameter as the enlarged diameter plate 25 is positioned over plate 75 with their apertures in registration. An intermediate diaphragm 77 similar to diaphragm 74 is positioned in registration over plate 76 and fixed in that position by lock nuts 78 and 79. Over the diaphragm 77 is a third plate 81 similar to plate 75, but positioned with its larger diameter facing diaphragm 77 and in registration with the aperture of spacer plate 76. An outer diaphragm 83 similar to the others is positioned over plate 10 and held on bolt 24' between head 22' and lock nut 82.

Once installed in cover plate recess 70, the entire plate-diaphragm-bolt assembly is finally secured to cover plate 14' by a thick outer pressure plate 85. The plate has a central cylindrical aperture of diameter equal to that of aperture 15' and is positioned within recess 70 over outer diaphragm 83. It is secured to cover plate 14' by bolts 86 with its aperture and that of plate 81 in alignment. In position, the outer plate 85 with the aid of other plate elements causes each of the diaphragms 74, 81, and 83 to be supported by a peripheral annular portion so that the remainder of the area of each diaphragm may flex to support the probe assembly 20' in the same resilient manner as in the case in the apparatus of FIG. 1.

As may be seen from FIG. 4, the region between the diaphragms constitutes sealed outer and intermediate independent chambers 91 and 92, respectively between diaphragms 83 and 81, and 81 and 74. A port 87 is provided leading to chamber 91 from the region between shaft end 12 and cover plate 14; this region itself is part of an independent sealed inner chamber 90 when containing a vacuum or pressurized air or fluid as described previously. A similar port 94 is provided between intermediate chamber 90 to the ambient outside atmosphere. For some applications a coil spring 95 is provided on probe bolt 24' between diaphragms 74 and 76.

This double diaphragm support means is especially useful for the detection of failure in pressurized lubrication systems typically used with heavy duty shafts, as well as at the same time detecting shaft displacements indicative of bearing failure. If instead, it is desired to detect failure of a pressurized air system or other fluid substance, the apparatus is equally useful. If the chamber 90 about the shaft end 12 forms part of the pressurized system and encloses pressurized air lubricant, or other fluid, port 87 allows it to enter into outer chamber 91. Intermediate chamber 92 merely contains air at atmospheric pressure. The pressure of the fluid over the area of diaphragm 83 causes a force acting away from shaft 10, while the pressure of the fluid over the area of diaphragm 77 causes a force toward shaft 10. It will be noted that the area of the surface of diaphragm 77 which is exposed to the pressurized fluid is substantially larger than the area of the diaphragm 83 so exposed, thus causing a net force due to the pressurized fluid in chamber 91 acting inwardly toward shaft 10, with the diaphragms 77 and 83 flexing inwardly toward the shaft. Thus the probe assembly 20' is biased toward the shaft and detects the shaft displacements as does the FIG. 1 apparatus, but in addition detects failure or drop of pressure in chamber 90. In case of such pressure failure, the inwardly flexed diaphragms relax to their unbiased state and thereby move the probe assembly 20' away from the shaft. Either sensing device 40 with a double-acting microswitch at 41, or the sensing device 40', may be used at probe end 22' to yield an electrical control or warning signal in accordance with probe assembly movements in either direction beyond a predetermined tolerance, as in the FIG. 1 apparatus.

The FIG. 4 apparatus is particularly useful when it is required to monitor pressure failure in a remote part of the machinery associated with shaft 10, or at a bearing remote from chamber 90 or end 12. In such applications, chamber 90 normally is at atmospheric pressure, or it may enclose a vacuum; in the latter case, spring 95 is utilized. A tube or other device connects port 87 and chamber 91 to the pressurized region to be monitored. Again, due to the larger area which is exposed to the pressurized fluid of diaphragm 77 as compared with diaphragm 83, a strong net force toward shaft end 12 is created and overcomes spring 95, if utilized, to bias probe assembly 20' against shaft end 12. Shaft displacements are transmitted to end 22', and a sensing device such as 40 or 40' is utilized to obtain control signals representative of the displacements, as described in the foregoing figures.

In case of failure of the fluid pressure in the monitored portion of the associated machinery or remote shaft bearing, chamber 91 is no longer under pressure. In applications in which chamber 90 is at ambient atmospheric pressure, the formerly inwardly flexed diaphragms relax to their unstressed flat state and thereby move the probe assembly 20' away from the shaft. In applications in which chamber 90 is under vacuum, spring 95, which formerly was overcome and compressed by the pressure in chamber 91, now overcomes the affect of atmospheric pressure in intermediate chamber 92 to move the probe assembly 20' away from the shaft. Again, with sensing device 40 or 40' at end 22' and the use of double-acting microswitches therein as described above, both types of movements of the probe assembly 20' beyond tolerance, outward movement indicating pressure failure, and inward movement to indicate bearing wear or failure, may be sensed and rendered as control signals, and the rate of wear also monitored continuously by a depth micrometer arrangement such as 50 in FIG. 1.

The above-described configurations are particularly advantageous from the standpoint of permitting a stationary sensing device to monitor the movements of a shaft which is rotating because of the resilient probe support means, and because it is effected in an inherently nearly frictionless manner. Ball 35 being a sphere has a very limited area of contact when contacted with bronze sleeve 26 and secured in stud 16, and linear speed of points on shaft end face 12 and stud 16 near the center of rotation, upon which ball 35 bears, is much less than at points near the periphery of the shaft, so that friction is at an absolute minimum.

The same inventive principles may be also embodied in still other similar configurations which would also effect a fairly good degree of avoidance of friction as well as the indication of shaft displacement of both radial and axial type. For example, the stud 16 may be dispensed with and replaced by a shallow concave depression at the center of rotation of shaft end 12. Similarly, another small low-contact surface member may be used instead of the ball bearing, for example, a single or double cone bearing with each cone apex captured in a shallow concave depression also, sleeve 26 may be shaped into a needle or cone configuration with its apex bearing upon a concave recess in the center of shaft end 12, or the end of sleeve 26 may be shaped as a hemisphere or other convex shape to match a concave shaft end recess. By the same token, shaft end 25 may include a hemispherical, conical, needle-like, or other convex-shaped axially protruding portion, which is captured within the concave end of sleeve 26 just as a ball 35. In the latter two cases of shaped sleeve 26 or shaft end 12, the probe assembly itself may act as a thrust bearing for supporting one end of the shaft 10.

Particularly in applications involving shafts of relatively small diameter, at least the sleeve 26 of probe assembly 20 may advantageously be of larger diameter than the shaft and be provided at the end facing the shaft with a concave recess of diameter similar to the shaft. The shaft end face itself may be a spherical or other convex shape suitable for engaging the concave end of sleeve 26, which itself, together with the remainder of the probe assembly, again may act as a thrust bearing for supporting the end 12 of shaft 10.

Of course it is not necessary that probe assembly be comprised of various discrete elements; it may be a completely integral unit. Similarly the support means of either FIGS. 1 or 4 may be replaced by other resilient supports such as a system of axial and radial springs which would allow radial and axial movement of the probe assembly 20, yet hold the probe in position at one end of shaft 10.

I claim:

1. Apparatus for use with a rotating shaft or the like supported on at least one bearing in a supporting housing for indicating non-rotational displacement of the shaft comprising:
   a displacement transmitting member contacting at least a portion of one end of said shaft;
   means secured to said supporting housing for resiliently suporting said transmitting member to maintain said transmitting member against said shaft in said end contact position while allowing said member to move with said shaft;
   and means including switch means supported upon said housing and bearing upon said transmitting member for sensing incremental displacements of said member at least in the axial direction of said shaft and providing a signal representative thereof, whereby diplacements of said shaft are indicated.

2. Apparatus as set forth in claim 1 in which said means for sensing incremental displacements includes micrometer means providing a continuous indication of wear in the axial direction.

3. Apparatus as set forth in claim 1 in which said means for sensing incremental displacements includes switch means adjustable to a preselected tolerance and providing an electrical signal when said axial shaft displacements exceed said tolerance.

4. Apparatus for use with a rotating shaft which is supported upon at least one bearing in a supporting housing and which has at least one exposed end for indicating non-rotational displacement of the shaft, comprising:
   a probe for contacting the axial center of rotation of said exposed shaft end;
   a resilient support for axially biasing the probe toward the axial center of said shaft end including means secured to said housing for movably supporting said probe in a position immediately adjacent said end of said shaft and generally in line with the axis thereof;
   and a bearing captured between said axial center of rotation of said shaft end and said probe to provide a substantially frictionless contact between said shaft and said probe, whereby said probe transmits at least axial displacements of each shaft.

5. Apparatus as set forth in claim 4 wherein said probe is non-rotatable and is concave at the end facing said shaft and said bearing is a ball bearing which is held by said concave end of said biased probe against said shaft center.

6. Apparatus as set forth in claim 5 which further includes a shaft contact member secured to the center of said shaft end, said shaft contact member having a concave portion facing opposite said concave probe end, said ball bearing being held between said opposed concave portions.

7. Apparatus as set forth in claim 4 in which said resilient support includes a thin diaphragm, said probe passing centrally therethrough and being fixed therein, and a rigid support carrying said diaphragm about its periphery, said support being secured to said housing whereby said probe may at the end facing of the shaft move radially or axially in accordance therewith and transmit said motion to the end opposite said shaft.

8. Apparatus as in claim 7 in which said resilient support includes at least one spring anchored to said supporting housing and attached to said probe biasing said probe axially toward said shaft.

9. Apparatus as set forth in claim 2 which further includes means bearing on said probe for sensing displacement of said probe with respect to said housing.

10. Apparatus as set forth in claim 9 in which said sensing means comprises a switch supported from said housing and bearing on said probe.

11. Apparatus as set forth in claim 10 in which said switch bears axially on the end of said probe opposite said shaft to thereby sense axial shaft displacements.

12. Apparatus as set forth in claim 11 in which said sensing means includes at least one further switch bearing on said probe transverse to the axis of said probe to thereby sense radial displacements.

13. Apparatus for use with a rotating shaft which is supported upon at least one bearing in a supporting housing and which has at least one exposed end for indicating non-rotational displacement of the shaft, comprising;
   a probe for contacting the axial center of rotation of said exposed shaft end;
   a resilient support to maintain the probe against said shaft end in said axial center contact position, including a thin diaphragm, said probe passing centrallly therethrough and being fixed therein, to movably support said probe in a position immediately adjacent said end of said shaft and generally in line with the axis thereof, said resilient support further including a rigid support carrying said diaphragm about its periphery, said support being secured to said housing, said diaphragm and housing forming a sealed chamber about said shaft end, said probe at the end facing the shaft being movable radially or axially in accordance therewith and transmitting said motion to the end opposite said shaft.

14. Apparatus as in claim 13 in which said sealed chamber encloses a vacuum, enabling atmospheric pressure to act on said diaphragm to bias said probe axially toward said shaft.

15. Apparatus for use with a rotating shaft which supported upon at least one bearing in a supporting housing and which has at least one exposed end for indicating non-rotational displacement of the shaft, comprising;

a probe for contacting the axial center of rotation of said exposed end;

a resilient support to maintain the probe against said shaft end in said axial center contact position, including a plurality of spaced parallel thin diaphragms, said probe passing centrally therethrough, each of said diaphragms being secured to said probe, and rigid support means engaging each of said diaphragms about its periphery and securing said diaphragm is said spaced parallel relationship to said housing for movably supporting said probe in a position immediately adjacent said end of said shaft and generally in line with the axis thereof to thereby enable said probe at the end facing said shaft to move radially or axially in accordance therewith and transmit said motion to the end opposite said shaft.

16. Apparatus as set forth in claim 15 in which said resilient support includes an outer, intermediate, and inner diaphragm, with the inner diaphragm closest to said shaft, said diaphragm forming therebetween two sealed chambers, with the outermost chamber communicating with the region between said housing and shaft, while the remaining chamber communicates with the atmosphere.

17. Apparatus as set forth in claim 16 in which the exposed areas of said outer and inner diaphragms not engaged by said rigid support means are of reduced area as compared to the exposed areas of said intermediate diaphragm.

18. Apparatus as set forth in claim 17 in which said inner diaphragm and said housing form a third sealed chamber about said shaft end.

19. Apparatus as set forth in claim 17 which further includes a spring carried on said probe between said inner and intermediate diaphragm and bearing thereon at its respective ends.

* * * * *

UNITED STATES PATENT OFFICE
CERTIFICATE OF CORRECTION

Patent No. 3,783,210            Dated January 1, 1974

Inventor(s)   Robert E. Spooner

It is certified that error appears in the above-identified patent and that said Letters Patent are hereby corrected as shown below:

Column 3, line 20, "28'" should be --28--.

Column 3, line 34, "In" should be --It".

Column 5, line 13, "100 degree" should be --180 degree--.

Column 5, line 16, "rsponse" should be --response--.

Column 9, line 20, "spherical" should be --hemispherical--.

Signed and sealed this 6th day of August 1974.

(SEAL)
Attest:

McCOY M. GIBSON, JR.          C. MARSHALL DANN
Attesting Officer             Commissioner of Patents